United States Patent
Nakajima

(10) Patent No.: US 7,735,215 B2
(45) Date of Patent: Jun. 15, 2010

(54) HOLDER FOR HOLDING A HEAD CARRIAGE IN A HARD DISK DRIVE

(75) Inventor: Tomohide Nakajima, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 30 days.

(21) Appl. No.: 12/019,243

(22) Filed: Jan. 24, 2008

(65) Prior Publication Data
US 2008/0192382 A1  Aug. 14, 2008

(30) Foreign Application Priority Data
Feb. 8, 2007  (JP) .............................. 2007-029851

(51) Int. Cl.
*G11C 5/12* (2006.01)

(52) U.S. Cl. .................. 29/737; 361/212; 360/265; 360/265.7; 174/5 R; 29/759; 29/760; 29/603.03

(58) Field of Classification Search .................. 29/737, 29/739, 759, 760, 603.03; 269/47, 903, 91, 269/92; 361/212, 219, 220; 174/5 R; 360/265, 360/265.7
See application file for complete search history.

(56) References Cited

U.S. PATENT DOCUMENTS

| | | | | | |
|---|---|---|---|---|---|
| 3,857,397 | A | * | 12/1974 | Brosseau | 607/149 |
| 4,570,200 | A | * | 2/1986 | Osada et al. | 361/212 |
| 4,852,374 | A | * | 8/1989 | Gotanda | 70/456 R |
| 5,295,872 | A | * | 3/1994 | Christensson | 439/822 |
| 5,812,357 | A | * | 9/1998 | Johansen et al. | 361/212 |
| 5,894,399 | A | * | 4/1999 | Wong et al. | 361/212 |
| 5,959,827 | A | * | 9/1999 | Smith et al. | 361/212 |
| 7,558,025 | B2 | * | 7/2009 | Saito | 360/265 |
| 2007/0003754 | A1 | * | 1/2007 | Okada et al. | 428/323 |

FOREIGN PATENT DOCUMENTS

| WO | WO 96/36963 A1 | 11/1996 |
|---|---|---|
| WO | WO 98/16954 A1 | 4/1998 |

\* cited by examiner

*Primary Examiner*—Derris H Banks
*Assistant Examiner*—Jeffrey Carley
(74) *Attorney, Agent, or Firm*—Greer, Burns & Crain, Ltd.

(57) ABSTRACT

A holder with includes: a holder body formed by molding a resin material, a contact surface on the holder body for receiving an operating object to be held on the holder body, a grip portion on the holder body at a position apart from the contact surface for being gripped by an operator, and an electric conductor extending from the contact surface to the grip portion.

6 Claims, 11 Drawing Sheets

HOLDER FOR HOLDING A HEAD CARRIAGE IN A HARD DISK DRIVE

BACKGROUND

1. Field

The present disclosure relates to a holder for holding a carriage which supports an operating object and is gripped by an operator and, for example, to a holder used to build a hard disk drive (HDD) having a carriage for supporting a head suspension assembly.

2. Description of the Related Art

A carriage for supporting a head suspension assembly is built in a hard disk drive. The carriage is held by a holder formed of an antistatic resin material in a process of manufacturing the hard disk drive. The operator holds the holder. In this manner, the carriage is protected from attachment of fine dust.

The carriage is charged in the process of manufacturing. When the charged carriage comes into contact with an electric conductor such as metal, a current flows from the carriage to the electric conductor. The current causes distribution of an induction current to a magneto-resistive element on the head suspension assembly.

Reference documents are Japanese translation of PCT international application Publication No. 11-505359 and PCT international application Publication No. 2001-502839.

In particular, a current-resistance value of the magneto-resistive element has become lower due to downsizing of the magneto-resistive element. As a result, distribution of the induction current can destroy the magneto-resistive element.

In view of such circumstances, it is an object of the present technique to provide a holder which is able to better prevent an operating object such as a magneto-resistive element from absorbing a destructive charge when holding the operating object.

SUMMARY

According to one aspect the technique, a holder includes a holder body formed by molding a resin material, a contact surface on the holder body for receiving an operating object to be held on the holder body, a grip portion on the holder body at a position apart from the contact surface for being gripped by an operator, and an electric conductor extending from the contact surface to the grip portion.

DESCRIPTION OF THE PREFERRED EMBODIMENTS

Referring now to the attached drawings, an embodiment of the disclosure will be described.

Figure 1:
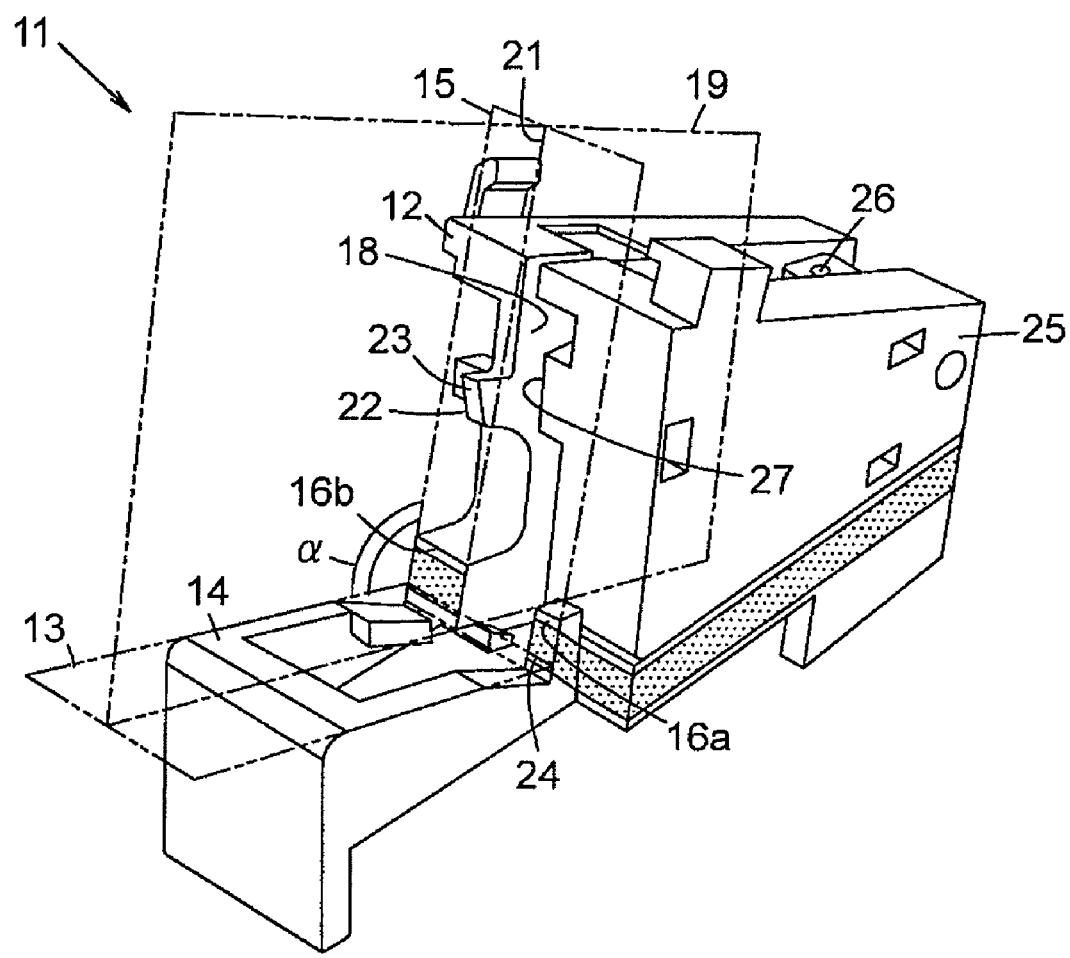
FIG. 1 is a perspective view showing a holder with an electric conductor according to a first embodiment of the disclosure.

FIG. 1 schematically illustrates a structure of a holder 11 according to a first embodiment of the disclosure. The holder 11 includes a holder body 12. The holder body 12 is formed of a resin material, that is, an antistatic resin material. As the antistatic resin material, for example, polycarbonate resin or ABS resin containing carbon fibers may be used. The holder body 12 has an arbitrary value of resistance within a range from 105Ω to 108Ω.

The surface of the holder body 12 includes a first contact surface 14 extending within a first virtual plane 13. Simultaneously, the surface of the holder body 12 includes second contact surfaces 16a and 16b extending within a second virtual plane 15. The second virtual plane 15 intersects the first virtual plane 13. The plane angle α is set to an acute angle. The first contact surface 14 is apart from the second virtual plane 15 by a predetermined distance. The surface of the holder body 12 is positioned apart from a space surrounded by the first virtual plane 13 and the second virtual plane 15 between the first contact surface 14 and the second virtual plane 15. In other words, a release space which is set back from the first virtual plane 13 is formed between the first contact surface 14 and the second virtual plane 15.

The second contact surfaces 16a and 16b are segmentalised by a predetermined space. In this space, a third contact surface 18 is defined on the surface of the holder body 12. The third contact surface 18 extends within a third virtual plane 19 which is orthogonal to the first and second virtual planes 13 and 15. The third contact surface 18 is connected to one of the second contact surfaces 16b by a line of intersection 21 between the second virtual plane 15 and the third virtual plane 19.

The holder body 12 is formed with a projection 22 which enters the space surrounded by the first virtual plane 13 and the second virtual plane 15 along the third virtual plane 19. The projection 22 is arranged at a position apart from the one of the second contact surface 16b along the second virtual plane 15 by a predetermined distance. The projection 22 includes a fourth contact surface 23. The fourth contact surface 23 is inclined so that the side farther from a line of intersection 24 between the first virtual plane 13 and the second virtual plane 15 is further from the second virtual plane 15 than the side closer to the line of intersection 24.

A clipping strip 25 is connected to the holder body 12. The clipping strip 25 is connected to the holder body 12 so as to be capable of rotating about an axis of rotation 26. The axis of rotation 26 extends, for example, in parallel to the third virtual plane 19. In this case, all that is essential here is that the axis of rotation 26 is extended, for example, in juxtaposition to the second virtual plane 15.

Figure 2:
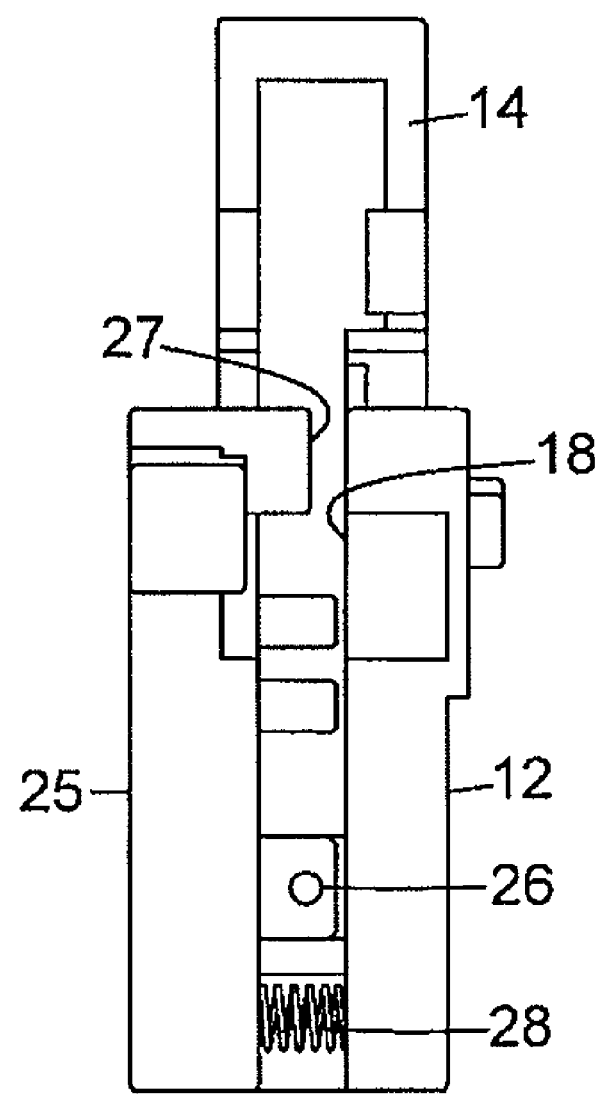
FIG. 2 is a plan view of the holder of FIG. 1.
Figure 3:
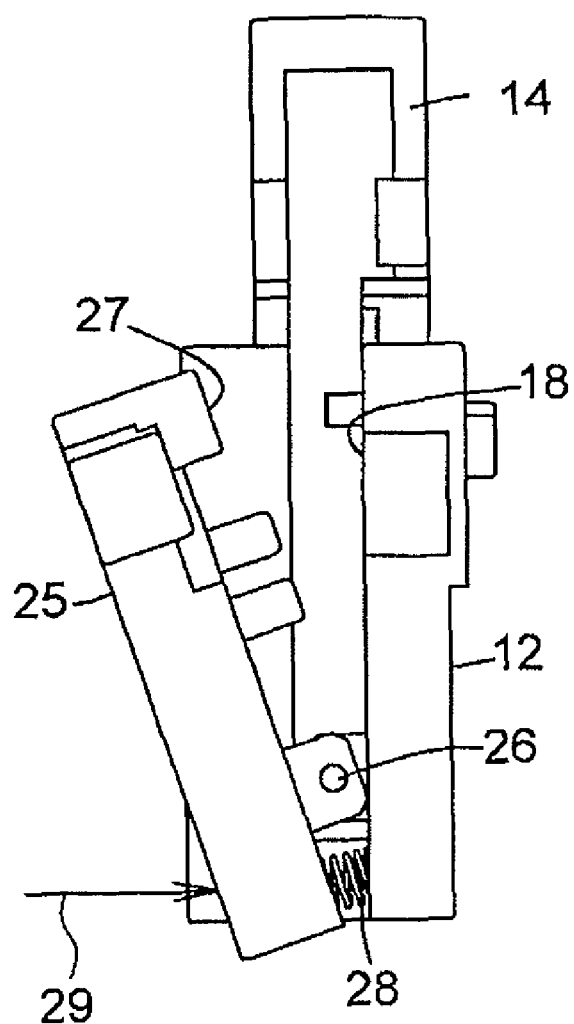
FIG. 3 is a plan view of the holder of FIG. 1 showing a movement of a clipping strip.

The surface of the clipping strip 25 includes a fifth contact surface 27. The fifth contact surface 27 is arranged at a position far from the axis of rotation 26 as much as possible. However, the fifth contact surface 27 does not enter the space surrounded by the first virtual plane 13 and the second virtual plane 15. As shown in FIG. 2, when the clipping strip 25 is positioned at a predetermined rotational angle about the axis of rotation 26, the fifth contact surface 27 faces the third contact surface 18 in parallel thereto at a predetermined distance. Interposed between the clipping strip 25 and the holder body 12 is an extension spring 28. The extension spring 28 exerts a drive force to the clipping strip 25 about the axis of rotation 26. The action of the extension spring 28 provides the fifth contact surface 27 with a pressing force toward the third contact surface 18. As shown in FIG. 3, when the extension spring 28 is contracted by an external force 29 exerted to the clipping strip 25, the fifth contact surface 27 is moved away from the third contact surface 18.

Figure 4:
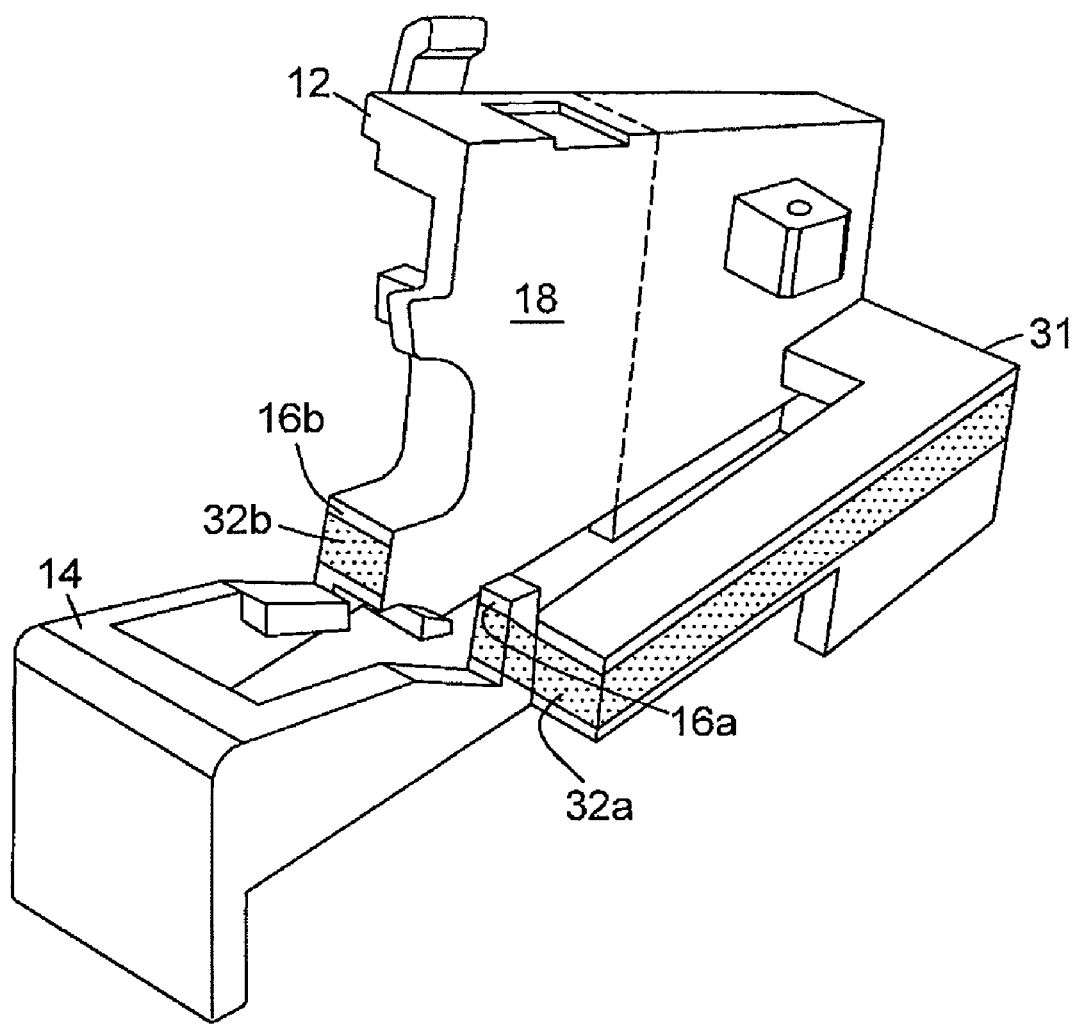
FIG. 4 is a perspective view of a holder body.

As shown in FIG. 4, the holder body 12 includes a grip portion 31 at a position apart from the first to fourth contact surfaces. The grip portion 31 can be pinched with fingers of a user of the holder 11 as described later. The surface of the holder body 12 includes first and second electric conductors 32a and 32b disposed thereon. The first electric conductor 32a extends from one of the second contact surfaces 16a to the grip portion 31.

Figure 5:
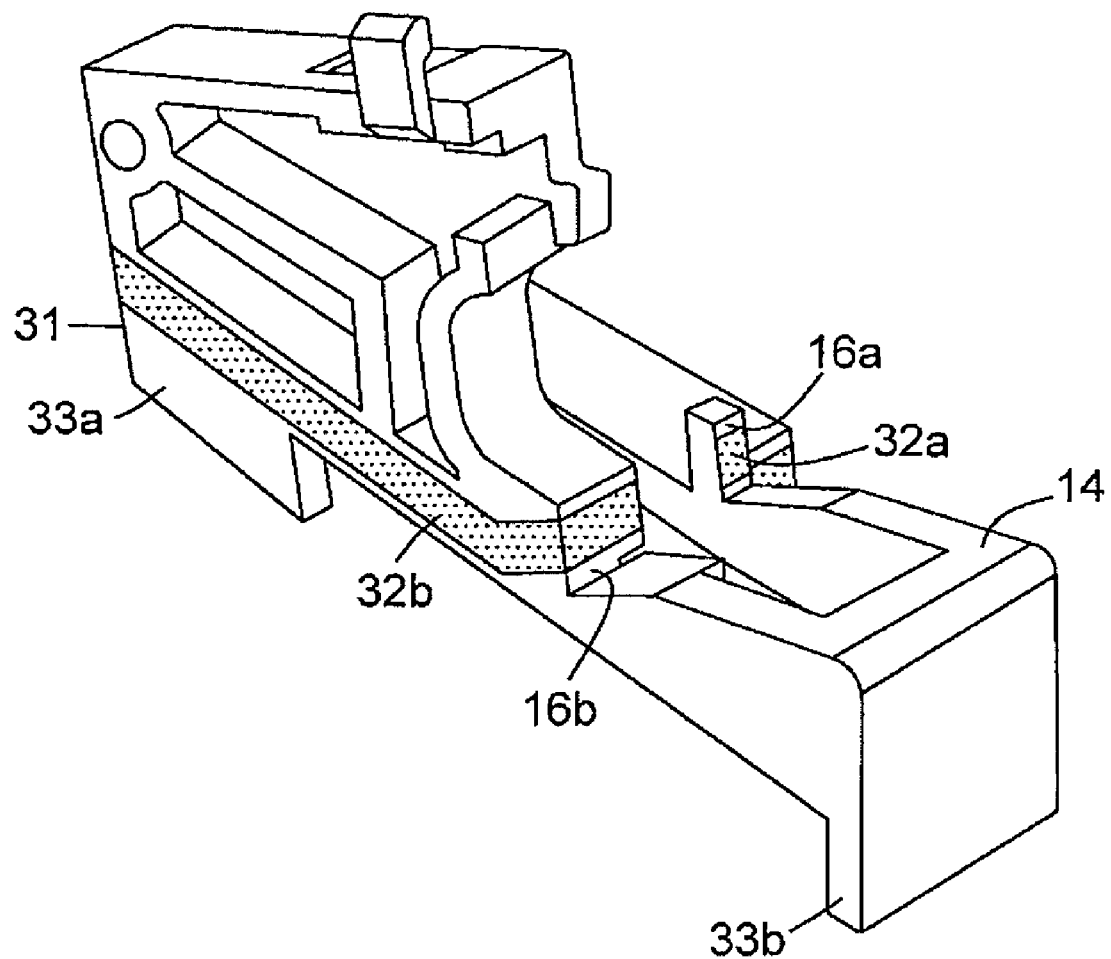
FIG. 5 is a perspective view of the holder body observed from another point of view.

As shown in FIG. 5, the second electric conductor 32b extends from the other second contact surface 16b to the grip portion 31 on the backside of the third contact surface 18. The first and second electric conductors 32a and 32b may be formed of, for example, a metal foil such as a copper foil. The metal foil is laid on the surface of the holder body 12. An adhesive layer is formed between the metal foil and the surface of the holder body 12. The metal foil is held on the holder body 12 by the action of the adhesive layer. In other words, the metal foil is adhered on the surface of the holder body 12.

The holder body 12 includes first and second leg portions 33a and 33b. The first leg portion 33a continues to the grip portion 31. The second leg portion 33b is located at the farthest position from the first leg portion 33a on the holder body 12. The first and second leg portions 33a and 33b define a bottom surface along a common plane. The holder body 12 is supported, for example, on a horizontal plane by the action of the first and second leg portions 33a and 33b.

Figure 6:
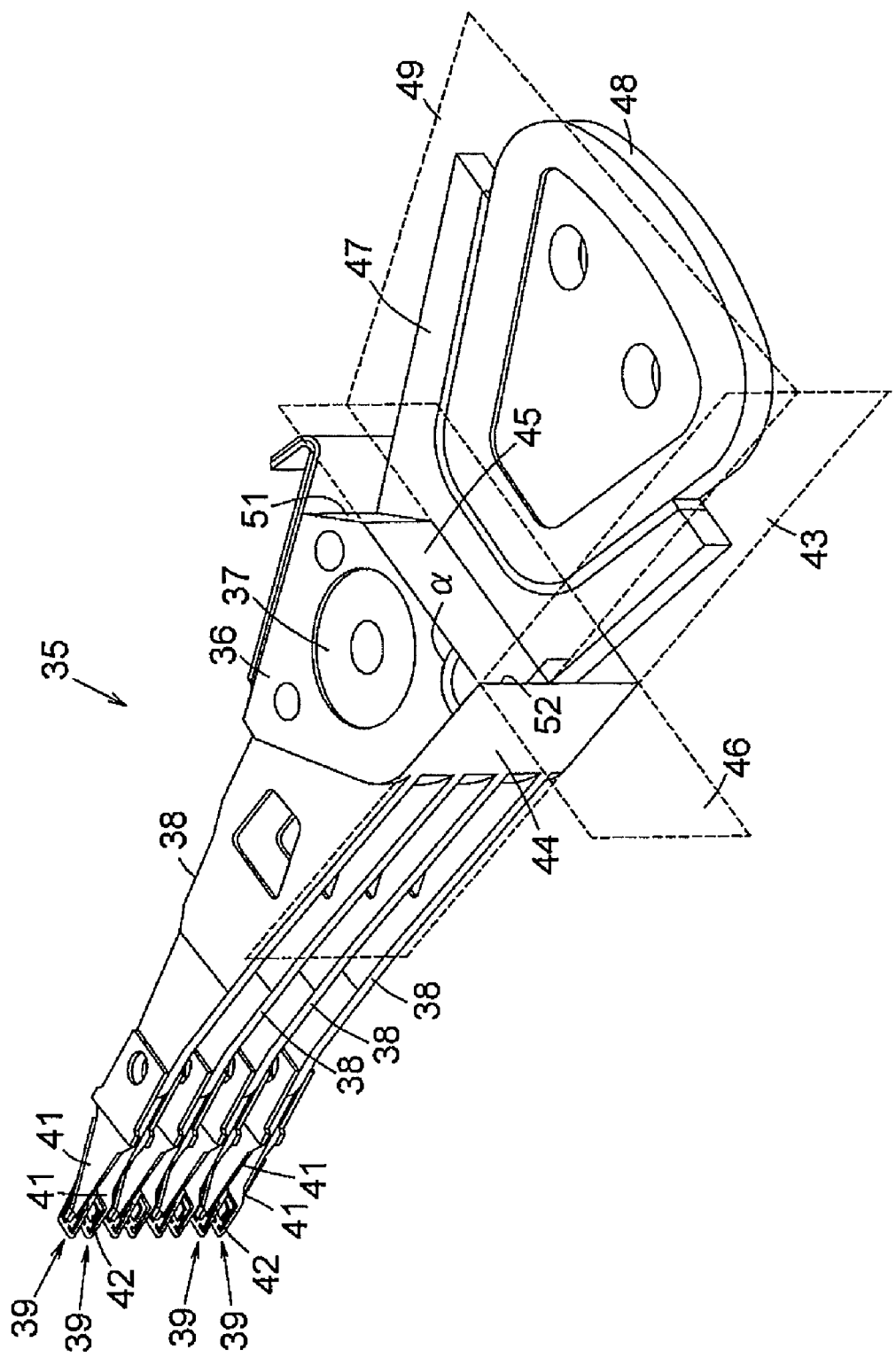
FIG. 6 is a perspective view of a carriage.

Now, a scene in which a carriage for a hard disk drive is held by the holder 11 is assumed. As shown in FIG. 6, a carriage 35 includes a carriage block 36. A revolving shaft 37 is embedded in the carriage block 36. The revolving shaft 37 is connected to the carriage block 36 via a ball bearing. The revolving shaft 37 is fixed to a housing (not shown) of the hard disk drive. In the housing, the carriage block 36 is capable of rotating about the revolving shaft 37. The carriage block 36 may be formed, for example, of aluminum. When molding the carriage block 36, for example, casting may be employed.

The carriage block 36 includes a plurality of carriage arms 38 extending along a plurality of planes which are orthogonal to the axial center of the revolving shaft 37. Each carriage arm 38 includes a pair of head suspension assemblies 39 at the distal end thereof. The head suspension assemblies 39 each include a head suspension 41 extending from the front end of the carriage arm 38 toward the front. A floating head slider 42 is fixed to the front end of the head suspension 41. The head suspensions 41 may be formed, for example, of stainless steel or aluminum. They may be formed by, for example, punching a metal plate.

The floating head slider 42 includes, for example, a hard slider body. The slider body can be formed of $Al_2O_3$—TiC. A soft $Al_2O_3$ film is laminated at one end of the slider body. A so-called magnetic head, that is, an electromagnetic sensing element (not shown) is embedded in the Al2O3 film. The electromagnetic sensing element includes a writing element and a reading element. The writing element may be a thin-film magnetic head or a single-pole head that serves to write information in a magnetic disk using magnetic field generated by a conductive thin-film coil pattern. The reading element may be, for example, a giant magneto-resistive (GMR) element or a tunnel junction magneto-resistive (TMR) element which serves to read information from the magnetic disk using a resistance change of a spin-valve film or a tunnel junction film.

The carriage block 36 includes a first outer surface 44 extending along a fourth virtual plane 43. The fourth virtual plane 43 extends in parallel to the axial center of the revolving shaft 37. The carriage block 36 also includes a second outer surface 45. The second outer surface 45 extends along a fifth virtual plane 46. The fifth virtual plane 46 intersects the fourth virtual plane 43 while extending in parallel to the axial center of the revolving shaft 37. The plane angle α between the fourth virtual plane 43 and the fifth virtual plane 46 is equal to the plane angle between the first virtual plane 13 and the second virtual plane 15.

The second outer surface 45 includes a coil holding portion 47 formed integrally therewith. A voice coil 48 for a voice coil motor is bonded to the coil holding portion 47. The coil holding portion 47 and the voice coil 48 extend along a sixth virtual plane 49. The sixth virtual plane 49 is orthogonal to the axial center of the revolving shaft 37.

The carriage block 36 further includes a third outer surface 51. The third outer surface 51 is connected to the second outer surface 45 at a position farthest from a line of intersection 52 between the fourth virtual plane 43 and the fifth virtual plane 46. The third outer surface 51 is set back from the fifth virtual plane 46. The third outer surface 51 extends in such a manner that the side farther from the line of intersection 52 between the fourth virtual plane 43 and the fifth virtual plane 46 is further from the fifth virtual plane 46 than the side closer to the line of intersection 52. The distance from the line of intersection 52 between the fourth virtual plane 43 and the fifth virtual plane 46 to the third outer surface 51 is equal to the distance from the line of intersection 24 between the first virtual plane 13 and the second virtual plane 15 to the projection 22.

When mounting the holder 11, an operator exerts the external force 29 to the clipping strip 25. The clipping strip 25 rotates about the axis of rotation 26 against a resilient force of the extension spring 28. The fifth contact surface 27 moves away from the third contact surface 18. The coil holding portion 47 and the voice coil 48 of the carriage 35 enter a space between the fifth contact surface 27 and the third contact surface 18.

Figure 7:
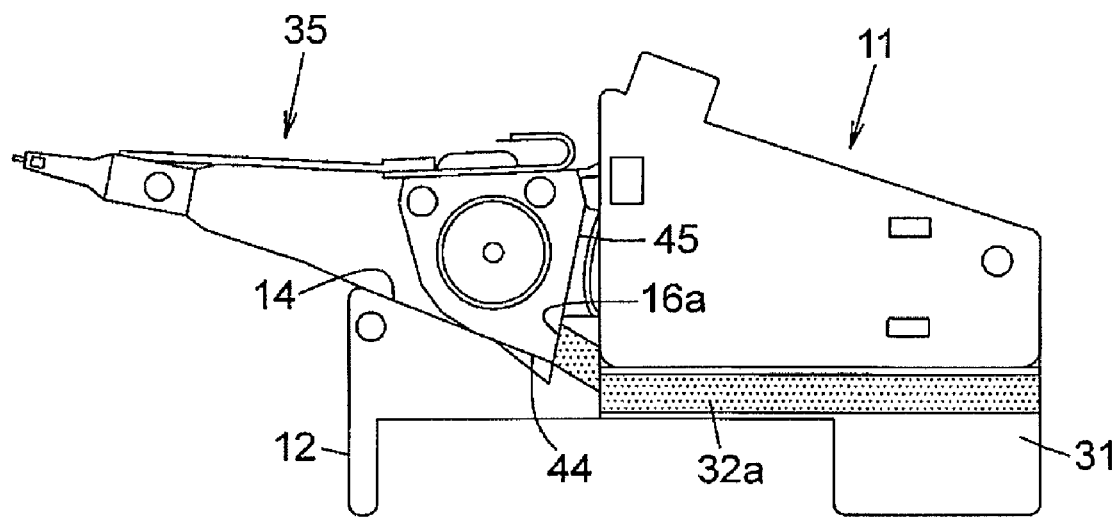
FIG. 7 is a side view of the holder of FIG. 1 mounted to the carriage of FIG. 7.

The coil holding portion 47 and the voice coil 48 of the carriage 35 are placed on the third contact surface 18. At this time, as shown in FIG. 7, the first outer surface 44 of the carriage 35 is pressed against the first contact surface 14. Simultaneously, the second outer surface 45 of the carriage 35 is pressed against the second contact surfaces 16a and 16b. In this manner, the carriage 35 is positioned on the holder body 12. The first outer surface 44 of the carriage 35 comes into contact with the first and second electric conductors 32a and 32b on the second contact surfaces 16a and 16b. Consequently, a predetermined current path is established through the carriage 35 and the first and second electric conductors 32a and 32b.

Subsequently, the external force 29 is removed from the clipping strip 25. The fifth contact surface 27 of the clipping strip 25 is moved forward about the axis of rotation 26 toward the third contact surface 18 on the holder body 12. The coil holding portion 47 and the voice coil 48 of the carriage 35 are sandwiched between the fifth contact surface 27 and the third contact surface 18. In this manner, the carriage 35 is held on the holder body 12.

Figure 8:
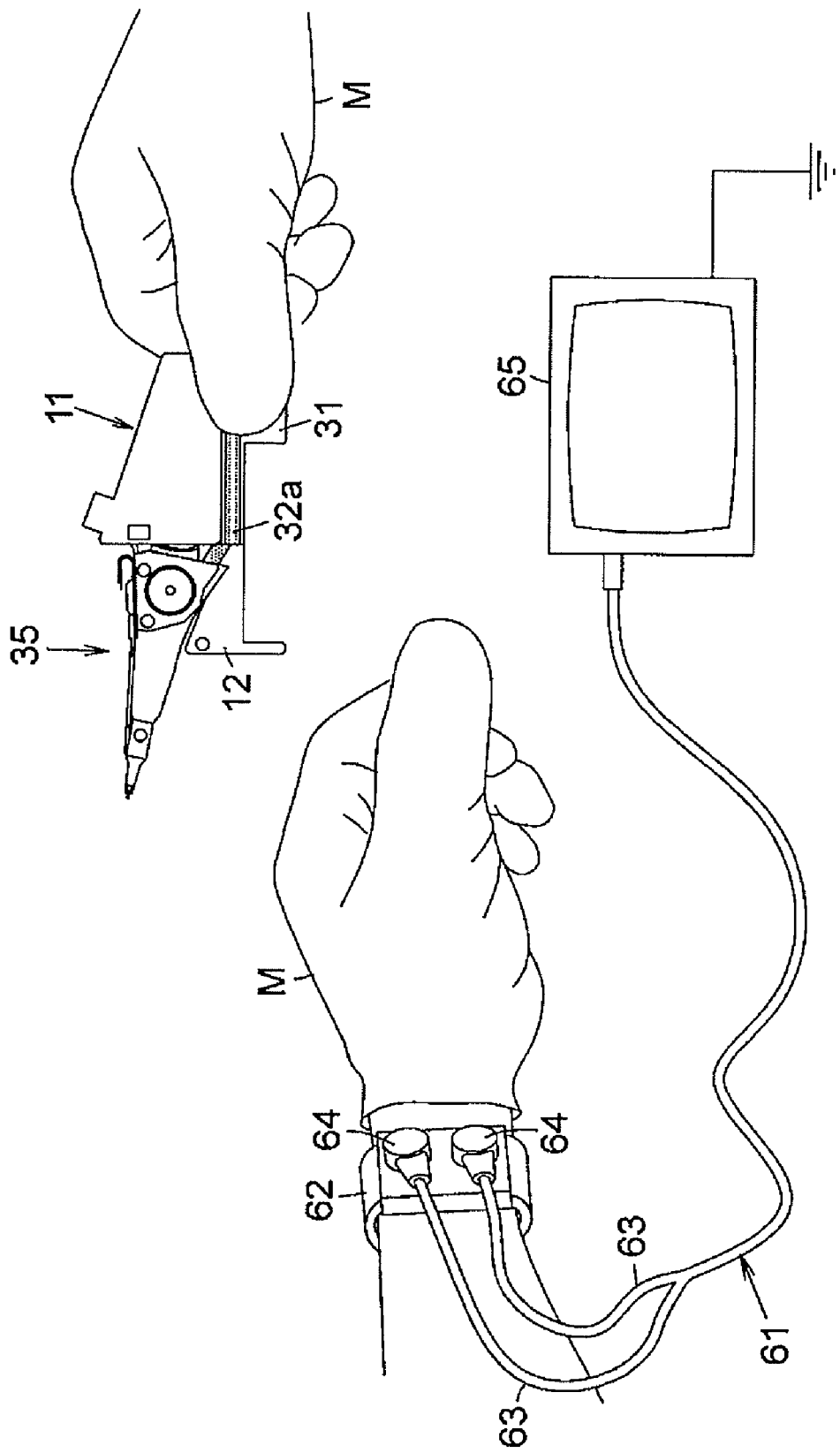
FIG. 8 is a conceptual drawing showing a method of usage of the holder of FIG. 1.

As shown in FIG. 8, an operator M grips the grip portion 31 of the holder body 12. Fingers of the operator M comes into direct contact with the current path. When gripping the holder body 12, the operator M wears, for example, a glove formed of nitrile rubber. The glove demonstrates a certain antistatic function. Static electricity on the carriage 35 is released gradually to the glove.

As shown in FIG. 8, when gripping the holder body 12, an earthing conductor unit 61 is connected to the operator. The earthing conductor unit 61 includes a wrist band 62. The wrist band 62 is put on the wrist of the operator M. The wrist band 62 is provided with a pair of electrodes (not shown) embedded therein. The electrodes come into contact with the skin of the operator.

Conductive lines such as wire cables 63 are connected individually to the respective electrodes. Connecting terminals 64 are formed at the distal ends of the wire cables 63 for connection. The respective connecting terminals 64 are attached to the corresponding electrodes individually. The wire cables 63 are grounded. In this case, a voltage monitor 65 is connected to the wire cables 63. Voltage values are displayed on the voltage monitor 65. When gripping the holder 11, the operator M can monitor the charged voltage value of his/her body.

The fingers of the operator M come into direct contact with the first and second electric conductors 32a and 32b, and hence the contact resistance between the carriage 35 and the operator M is remarkably reduced. Consequently, static electricity on the carriage 35 flows easily into the body of the operator M. At this time, static electricity in the operator M's body is released therefrom by the action of the earthing conductor unit 61. The charged voltage value in the operator M's body may be restrained to a level lower than 5 V. The charged voltage of the carriage 35 is constantly restrained to a low level.

Technical personnel confirmed the effects of the first and second electric conductors 32a and 32b. At the time of confirmation, electrostatic discharge (ESD) of the carriage 35 and a current value of the reading element were measured. The holder 11 was attached to the carriage 35. An experimenter pinched the grip portion 31 of the holder with electric conductor 11 with his/her fingers. Contact between the first and second electric conductors 32a and 32b and the fingers was established. The earthing conductor unit 61 was attached to the experimenter. The wrist band 62 of the earthing conductor unit 61 was put on the wrist of the experimenter as described above.

Air was blown from an ionizer to the carriage 35. Ions in the air were intentionally unbalanced, so that static electricity was generated on the carriage 35 by the action of the ionizer.

Figure 9:
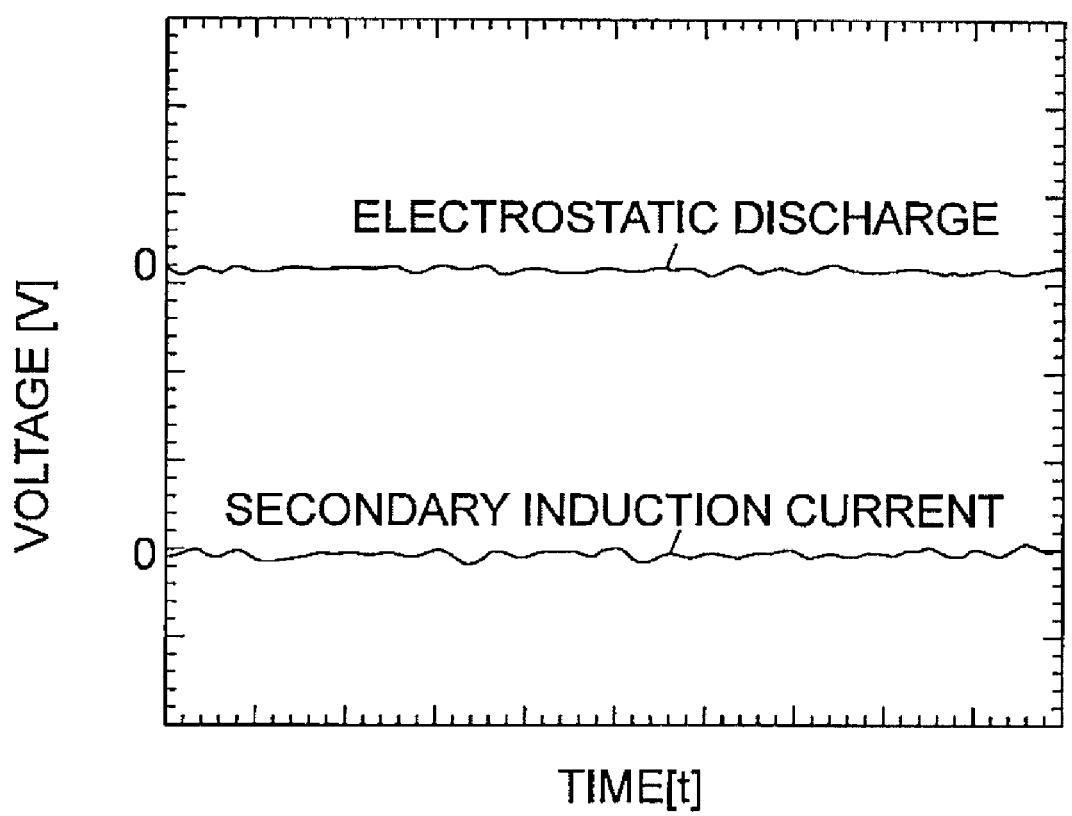
FIG. 9 is a graph showing electrostatic discharge of the carriage held by the holder according to the disclosure and a secondary induction current of a reading element.

As shown in FIG. 9, electrostatic discharge from the carriage 35 was not detected. In general, when electrostatic discharge of this type is generated, a secondary induction current flows through the reading element on the floating head slider 42 on the basis of a current generated by electrostatic discharge. The secondary induction current was not detected in the carriage 35.

The technical personnel prepared a holder for confirming the effects described above. The holder was the holder 11 from which the electric conductors 32a and 32b were omitted. The current path was not formed between the fingers of the experimenter and the carriage 35. A relatively large contact resistance was established between the carriage 35 and the holder body 12. In the same manner, a relatively large contact resistance was established between the holder body 12 and the fingers. Other conditions were the same as the case of the holder with electric conductor 11.

Figure 10:
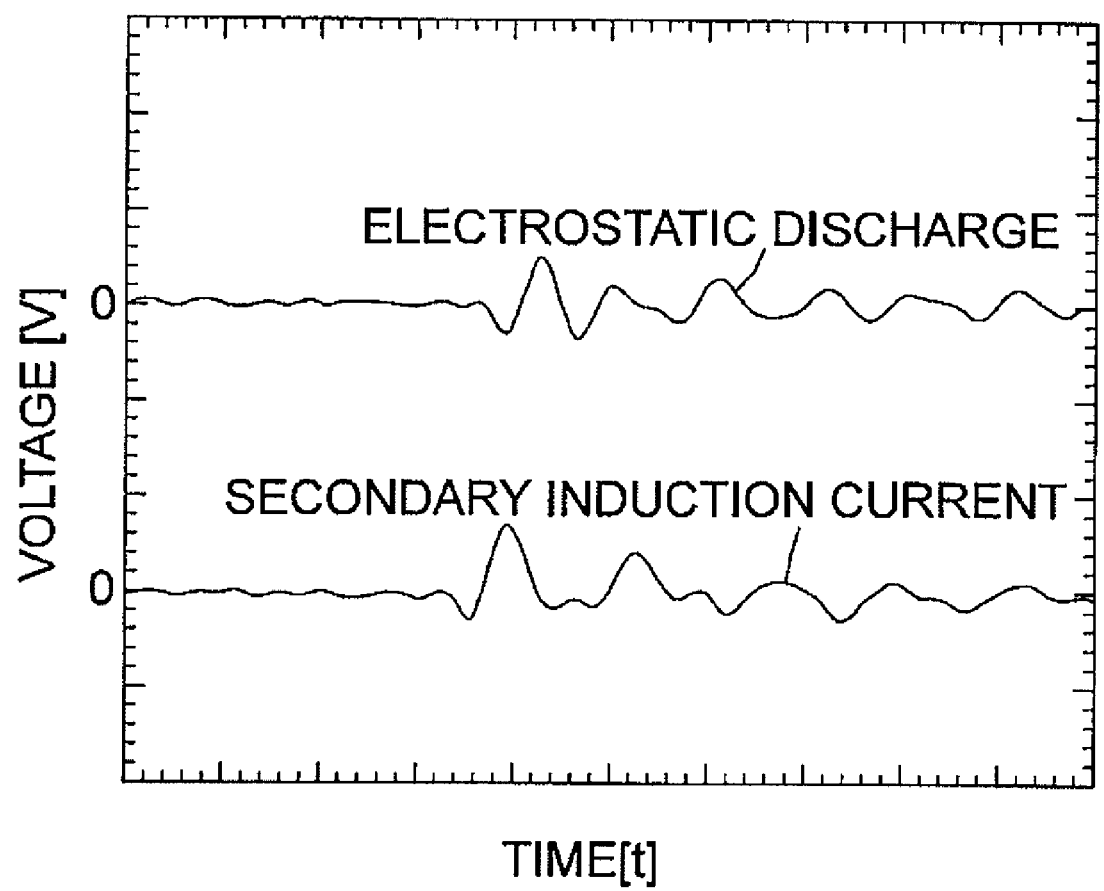
FIG. 10 is a graph showing electrostatic discharge of the carriage held by the holder according to a comparative example and a secondary induction current of a reading element.

As shown in FIG. 10, in the carriage 35, relatively large electrostatic discharge higher than 5V was detected. A distribution of the secondary induction current was detected in the reading element on the floating head slider 42.

Figure 11:
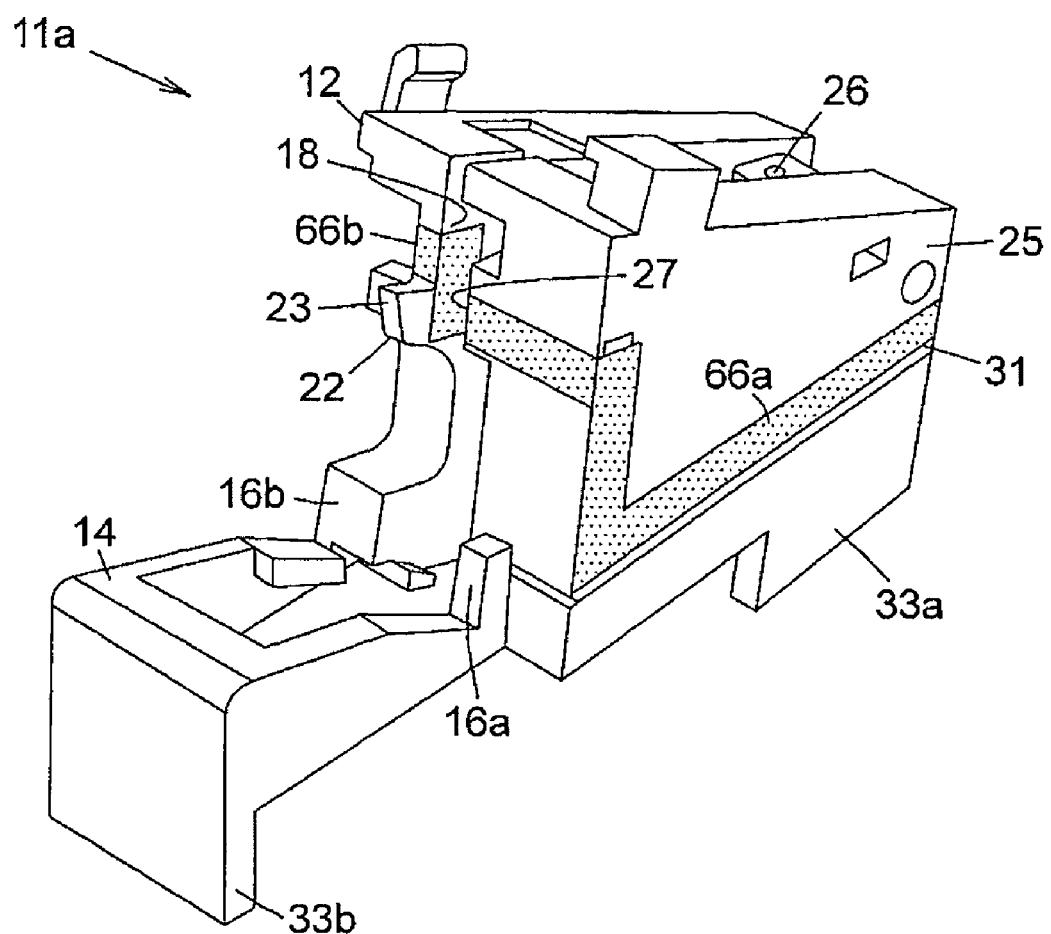
FIG. 11 is a perspective view of a holder with an electric conductor according to a second embodiment of the disclosure.

FIG. 11 shows a holder with electric conductor 11a according to a second embodiment. The holder with electric conductor 11a is configured in such a manner that a first electric conductor 66a extends from the fifth contact surface 27 of the clipping strip 25. A second electric conductor 66b extends from the third contact surface 18. In this case, the clipping strip 25 includes the grip portion 31 at a part thereof.

The first electric conductor 66a extends on the clipping strip 25 from the fifth contact surface 27 to the grip portion 31. The second electric conductor 66b extends from a third contact surface 18 to the grip portion 31. In this configuration, when the coil holding portion 47 and the voice coil 48 of the carriage 35 are sandwiched between the fifth contact surface 27 and the third contact surface 18, the carriage 35 positively comes into contact with the first electric conductor 66a and the second electric conductor 66b. A predetermined current path is reliably established. Components equivalent to the first embodiment shown above are represented by the same reference numerals.

According to the disclosure, a current path is established between the operating object and the electric conductor. When the grip portion is pinched by the fingers of the operator, the fingers of the operator come into direct contact with the electric conductor. The contact resistance between the operating object and the operator is significantly reduced. Static electricity on the operating object flows easily into the body of the operator. In this manner, electrostatic charge in the operating object is prevented as much as possible. Here, the holder body may be formed of the antistatic resin material.

In the holder with electric conductor, the electric conductor may include a metal foil to be laid on the holder body from the contact surface to the grip portion and adhered to the holder body. With the metal foil like this, a current path is easily formed on the holder body. The holder with electric conductor is realized relatively with ease.

The holder with electric conductor may further include a clipping strip to be connected to the holder body so as to be capable of rotating about a given axis of rotation and a resilient member for pressing the clipping strip against the holder body about the axis of rotation. The operating object can be held on the holder body stably with a pressing force exerted from the clipping strip. The contact between the operating object and the contact surface can reliably be maintained.

The holder with electric conductor may be used when holding the carriage. The carriage is built in the hard disk drive. The carriage supports a head suspension assembly. A so-called head element is built in the head suspension assembly. When electrostatic charge is prevented as described above, generation of the secondary induction current in the head element is reliably prevented. The breakage of the head element is avoided.

Since the holder is formed into a complex shape, if the entire holder is formed of a metallic material, an advanced technical skill is required for machining the same. Therefore, the manufacturing cost is increased. The weight is also increased. Since the holder is handled manually by hand, the weight reduction is required for the holders. When the entire holder is formed of the resin material, the manufacturing cost is reduced. The weight reduction of the holder is realized. However, sufficient conduction is not achieved by such the holder. Even through an electrostatic discharge (ESD) glove is used, the carriage and the holder is subjected to induction charging. Consequently, electrostatic discharge from the carriage to the facility occurs. The generation of the secondary induction current cannot be prevented by the head element.

As described above, according to the disclosure, there is provided a holder which can prevent an operating object from being electrostatically charged as much as possible when holding the operating object.

What is claimed is:

1. A holder comprising:
    a holder body formed by molding a resin material;
    a clipping strip formed of the resin material and connected to the holder body so as to be capable of rotating in a given axis of rotation;
    a resilient member for pressing the clipping strip against the holder body about the axis of rotation;
    a contact surface defined on the clipping strip for receiving an operating object to be held on the holder body;
    a grip portion defined on the clipping strip at a position apart from the contact surface for being gripped by an operator;
    an electric conductor extending from the contact surface to the grip portion;
    a body-side contact surface defined on the holder body for receiving the operating object to be held on the holder body;
    a body-side grip portion defined on the holder body at a position apart from the body-side contact surface for being gripped by the operator; and
    a body-side electric conductor extending from the body-side contact surface to the body-side grip portion.

2. The holder according to claim 1, wherein the electric conductor includes a metal foil laid on the clipping strip from the contact surface to the grip portion and adhered to the clipping strip.

3. The holder according to claim 1, wherein the body-side electric conductor includes a metal foil to be laid on the holder body from the body-side contact surface to the body-side grip portion and adhered to the holder body.

4. The holder according to claim 1, wherein the clipping strip is formed of an antistatic resin material.

5. The holder according to claim 1, wherein the holder body is formed of an antistatic resin material.

6. The holder according to claim 1, wherein the operating object is a carriage to be built in a hard disk drive for supporting a head suspension assembly.

* * * * *